US010735121B2

(12) United States Patent
Fakoorian et al.

(10) Patent No.: US 10,735,121 B2
(45) Date of Patent: Aug. 4, 2020

(54) UNIFIED SPATIAL OPERATION FOR DYNAMIC MEDIUM SHARING

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 15/684,495

(22) Filed: Aug. 23, 2017

(65) Prior Publication Data
US 2018/0219642 A1    Aug. 2, 2018

Related U.S. Application Data

(60) Provisional application No. 62/453,881, filed on Feb. 2, 2017.

(51) Int. Cl.
*H04W 72/04* (2009.01)
*H04W 72/10* (2009.01)
(Continued)

(52) U.S. Cl.
CPC ............ *H04J 11/0033* (2013.01); *H04B 1/10* (2013.01); *H04B 7/0413* (2013.01);
(Continued)

(58) Field of Classification Search
CPC .............. H04J 11/0033; H04L 25/0204; H04L 25/0224; H04B 7/0452; H04W 72/10; H04W 16/14; H04W 72/0406
See application file for complete search history.

(56) References Cited

U.S. PATENT DOCUMENTS 8,385,436 B2 * 2/2013 Holm .................... H04W 72/02
375/260
9,729,220 B1 * 8/2017 Harel ................... H04B 7/0617
(Continued)

FOREIGN PATENT DOCUMENTS

EP          3255811 A1 * 12/2017
WO    WO-2016069144 A1    5/2016

OTHER PUBLICATIONS

International Search Report and Written Opinion—PCT/US2018/014675—ISA/EPO—dated Apr. 30, 2018.

*Primary Examiner* — Muthuswamy G Manoharan
(74) *Attorney, Agent, or Firm* — Liem T. Do

(57) ABSTRACT

Unified spatial operations for dynamic medium sharing is disclosed in which a non-priority transmitter detects a priority reservation reference signal (RRS) over a shared spectrum from a high-priority transmitter The shared spectrum is shared by the non-priority transmitter with at least one high-priority communication pair. The high-priority communication pair includes a high-priority transmitter and the high-priority receiver. After detecting the RRS, the non-priority transmitter generates a non-priority channel estimate for a first channel between the non-priority transmitter and a non-priority receiver and a priority channel estimate for a second channel between the non-priority transmitter and the priority receiver. The non-priority transmitter transmits data on the shared spectrum using a transmission precoder determined using the non-priority channel estimate and the priority channel estimate, wherein the transmission precoder aligns transmission of the data to minimize interference with the high-priority receiver.

30 Claims, 12 Drawing Sheets

(51) Int. Cl.
*H04W 16/14* (2009.01)
*H04W 72/12* (2009.01)
*H04J 11/00* (2006.01)
*H04L 25/02* (2006.01)
*H04L 5/00* (2006.01)
*H04L 5/14* (2006.01)
*H04B 1/10* (2006.01)
*H04B 7/0452* (2017.01)
*H04B 7/0413* (2017.01)

(52) U.S. Cl.
CPC .......... *H04L 5/0037* (2013.01); *H04L 5/0048* (2013.01); *H04L 5/0073* (2013.01); *H04L 25/0204* (2013.01); *H04L 25/0206* (2013.01); *H04L 25/0224* (2013.01); *H04W 16/14* (2013.01); *H04W 72/0406* (2013.01); *H04W 72/10* (2013.01); *H04B 7/0452* (2013.01); *H04J 11/0073* (2013.01); *H04J 11/0076* (2013.01); *H04L 5/0023* (2013.01); *H04L 5/14* (2013.01); *H04L 25/02* (2013.01); *H04W 72/1247* (2013.01)

(56) References Cited

U.S. PATENT DOCUMENTS

| | | | |
|---|---|---|---|
| 2010/0227613 A1* | 9/2010 | Kim | H04L 25/03828 455/434 |
| 2013/0163523 A1 | 6/2013 | Hughes et al. | |
| 2014/0307818 A1* | 10/2014 | Jindal | H04W 28/0215 375/267 |
| 2015/0195017 A1* | 7/2015 | Wang | H04B 7/0417 375/267 |
| 2016/0219616 A1* | 7/2016 | Ni | H04W 72/14 |
| 2016/0241275 A1 | 8/2016 | MacMullan | |
| 2016/0373223 A1 | 12/2016 | Quick, Jr. | |
| 2017/0041049 A1* | 2/2017 | Lee | H04B 7/0456 |
| 2018/0220388 A1* | 8/2018 | Chae | H04W 56/00 |
| 2018/0220481 A1* | 8/2018 | Seo | H04L 1/18 |
| 2018/0331737 A1* | 11/2018 | Thurfjell | H04B 7/0486 |

* cited by examiner

UNIFIED SPATIAL OPERATION FOR DYNAMIC MEDIUM SHARING

CROSS-REFERENCE TO RELATED APPLICATIONS

This application claims the benefit of U.S. Provisional Patent Application No. 62/453,881, entitled, "UNIFIED SPATIAL OPERATION FOR DYNAMIC MEDIUM SHARING," filed on Feb. 2, 2017, which is expressly incorporated by reference herein in its entirety.

BACKGROUND

Field

Aspects of the present disclosure relate generally to wireless communication systems, and more particularly, to unified spatial operation for dynamic medium sharing.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes detecting, by a non-priority transmitter, a priority reservation reference signal (RRS) over a shared spectrum from a high-priority transmitter, wherein the shared spectrum is shared by the non-priority transmitter with at least one high-priority communication pair, wherein the at least one high-priority communication pair includes a high-priority transmitter and the high-priority receiver, generating, by the non-priority transmitter, a non-priority channel estimate for a first channel between the non-priority transmitter and a non-priority receiver and a priority channel estimate for a second channel between the non-priority transmitter and the priority receiver, and transmitting, by the non-priority transmitter, data on the shared spectrum using a transmission precoder determined using the non-priority channel estimate and the priority channel estimate, wherein the transmission precoder aligns transmission of the data to minimize interference with the high-priority receiver.

In an additional aspect of the disclosure, an apparatus configured for wireless communication includes means for detecting, by a non-priority transmitter, a priority RRS over a shared spectrum from a high-priority transmitter, wherein the shared spectrum is shared by the non-priority transmitter with at least one high-priority communication pair, wherein the at least one high-priority communication pair includes a high-priority transmitter and the high-priority receiver, means for generating, by the non-priority transmitter, a non-priority channel estimate for a first channel between the non-priority transmitter and a non-priority receiver and a priority channel estimate for a second channel between the non-priority transmitter and the priority receiver, and means for transmitting, by the non-priority transmitter, data on the shared spectrum using a transmission precoder determined using the non-priority channel estimate and the priority channel estimate, wherein the transmission precoder aligns transmission of the data to minimize interference with the high-priority receiver.

In an additional aspect of the disclosure, a non-transitory computer-readable medium having program code recorded thereon. The program code further includes code to detect, by a non-priority transmitter, a priority RRS over a shared spectrum from a high-priority transmitter, wherein the shared spectrum is shared by the non-priority transmitter with at least one high-priority communication pair, wherein the at least one high-priority communication pair includes a high-priority transmitter and the high-priority receiver, code to generate, by the non-priority transmitter, a non-priority channel estimate for a first channel between the non-priority transmitter and a non-priority receiver and a priority channel estimate for a second channel between the non-priority transmitter and the priority receiver, and code to transmit, by the non-priority transmitter, data on the shared spectrum using a transmission precoder determined using the non-priority channel estimate and the priority channel estimate, wherein the transmission precoder aligns transmission of the data to minimize interference with the high-priority receiver.

In an additional aspect of the disclosure, an apparatus configured for wireless communication is disclosed. The apparatus includes at least one processor, and a memory coupled to the processor. The processor is configured to detect, by a non-priority transmitter, a priority RRS over a shared spectrum from a high-priority transmitter, wherein the shared spectrum is shared by the non-priority transmitter with at least one high-priority communication pair, wherein the at least one high-priority communication pair includes a high-priority transmitter and the high-priority receiver, to generate, by the non-priority transmitter, a non-priority channel estimate for a first channel between the non-priority transmitter and a non-priority receiver and a priority channel estimate for a second channel between the non-priority transmitter and the priority receiver, and to transmit, by the non-priority transmitter, data on the shared spectrum using a transmission precoder determined using the non-priority channel estimate and the priority channel estimate, wherein the transmission precoder aligns transmission of the data to minimize interference with the high-priority receiver.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
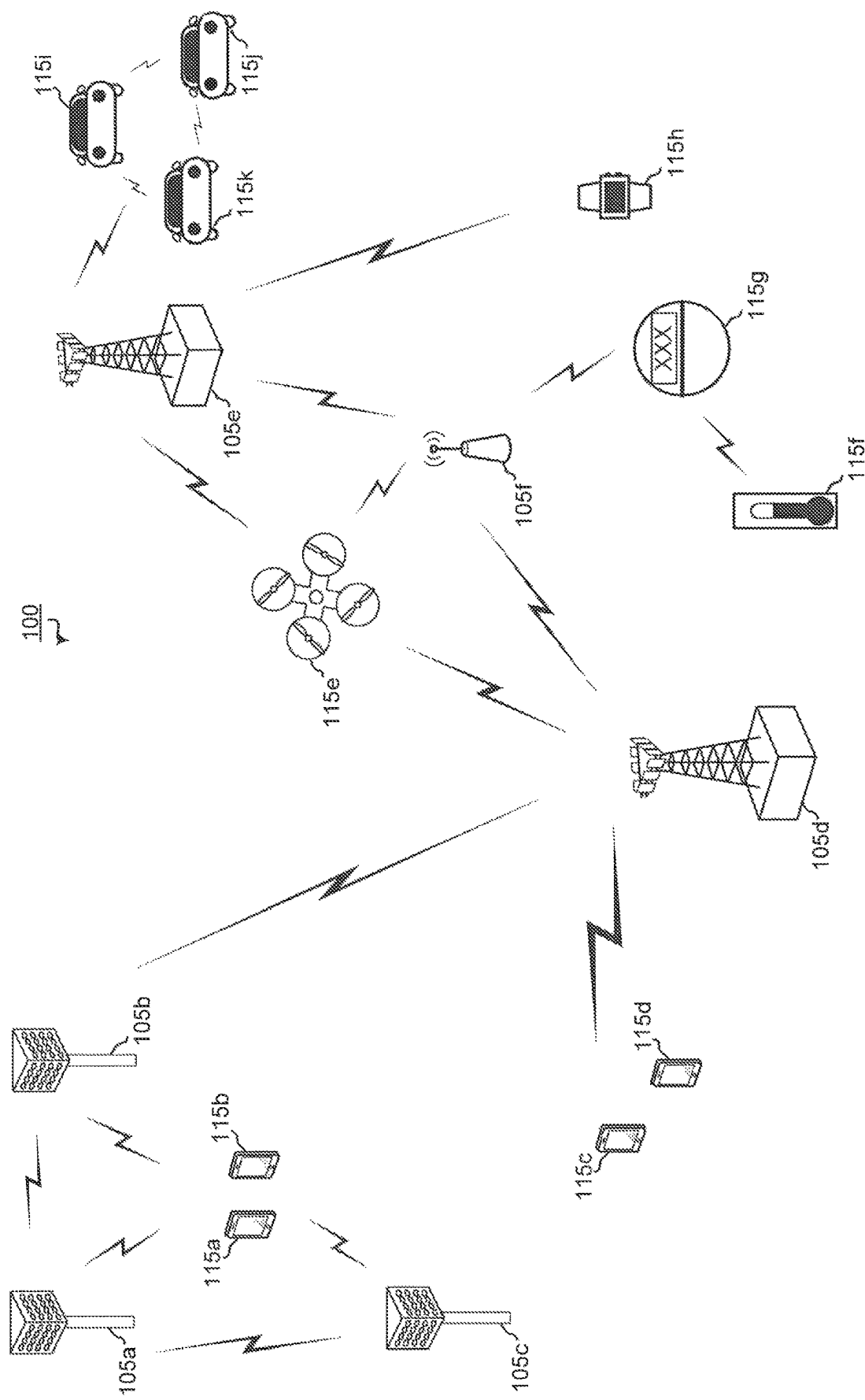
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of evolved node Bs (eNBs) 105 and other network entities. An eNB may be a station that communicates with the UEs and may also be referred to as a base station, a an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105*d* and 105*e* are regular macro eNBs, while eNBs 105*a*-105*c* are macro eNBs enabled with one of 3 dimension (3D), full dimension (FD), or massive MIMO. eNBs 105*a*-105*c* take advantage of their higher dimension MIMO capabilities to exploit 3D beamforming in both elevation and azimuth beamforming to increase coverage and capacity. eNB 105*f* is a small cell eNB which may be a home node or portable access point. An eNB may support one or multiple (e.g., two, three, four, and the like) cells.

The 5G network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115*a*-115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the eNBs, whether macro eNB, small cell, or the like. In FIG. 1, a lightning bolt (e.g., communication links) indicates wireless transmissions between a UE and a serving eNB, which is an eNB designated to serve the UE on the downlink and/or uplink, or desired transmission between eNBs, and backhaul transmissions between eNBs.

In operation at 5G network 100, eNBs 105a-105c serve UEs 115a and 115b using 3D beamforming and coordinated spatial techniques, such as coordinated multipoint (CoMP) or multi-connectivity. Macro eNB 105d performs backhaul communications with eNBs 105a-105c, as well as small cell, eNB 105f. Macro eNB 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro eNBs 105d and 105e, as well as small cell eNB 105f. Other machine type devices, such as UE 115f (thermometer), UE 115g (smart meter), and UE 115h (wearable device) may communicate through 5G network 100 either directly with base stations, such as small cell eNB 105f, and macro eNB 105e, or in multi-hop configurations by communicating with another user device which relays its information to the network, such as UE 115f communicating temperature measurement information to the smart meter, UE 115g, which is then reported to the network through small cell eNB 105f. 5G network 100 may also provide additional network efficiency through dynamic, low-latency TDD/FDD communications, such as in a vehicle-to-vehicle (V2V) mesh network between UEs 115i-115k communicating with macro eNB 105e.

Figure 2:
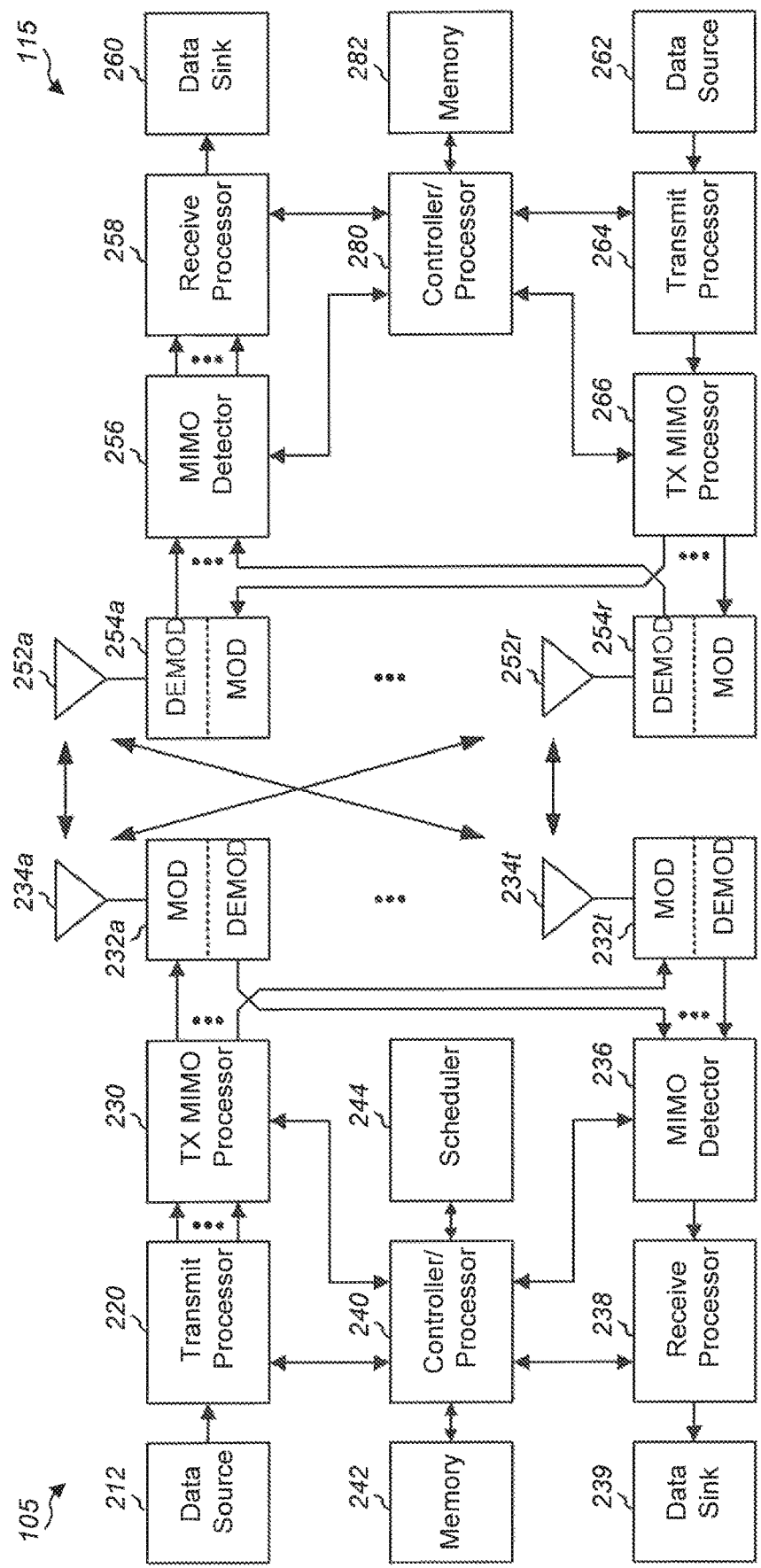
FIG. 2 is a block diagram illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. At the eNB 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the eNB 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
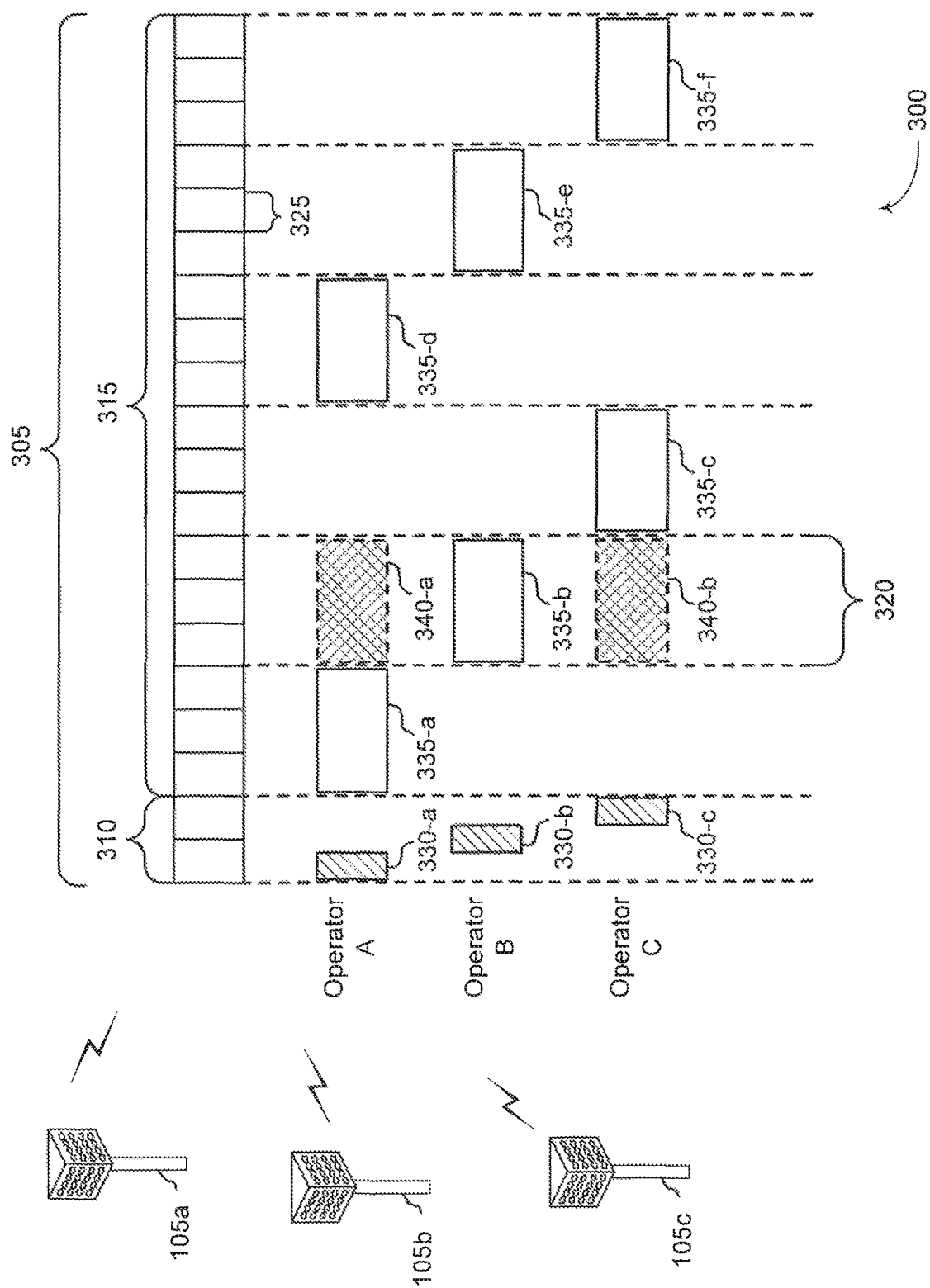
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305.

This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation reference signal (RRS) (e.g., request-to-send (RTS)/clear-to-send (CTS), channel state information reference signal (CSI-RS), sounding reference signal (SRS), and the like), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

With multiple different network nodes competing for communication access on shared spectrum, various techniques have been suggested to increase communication efficiency between nodes based on network operators, power class, link direction, and the like.

Figure 4:
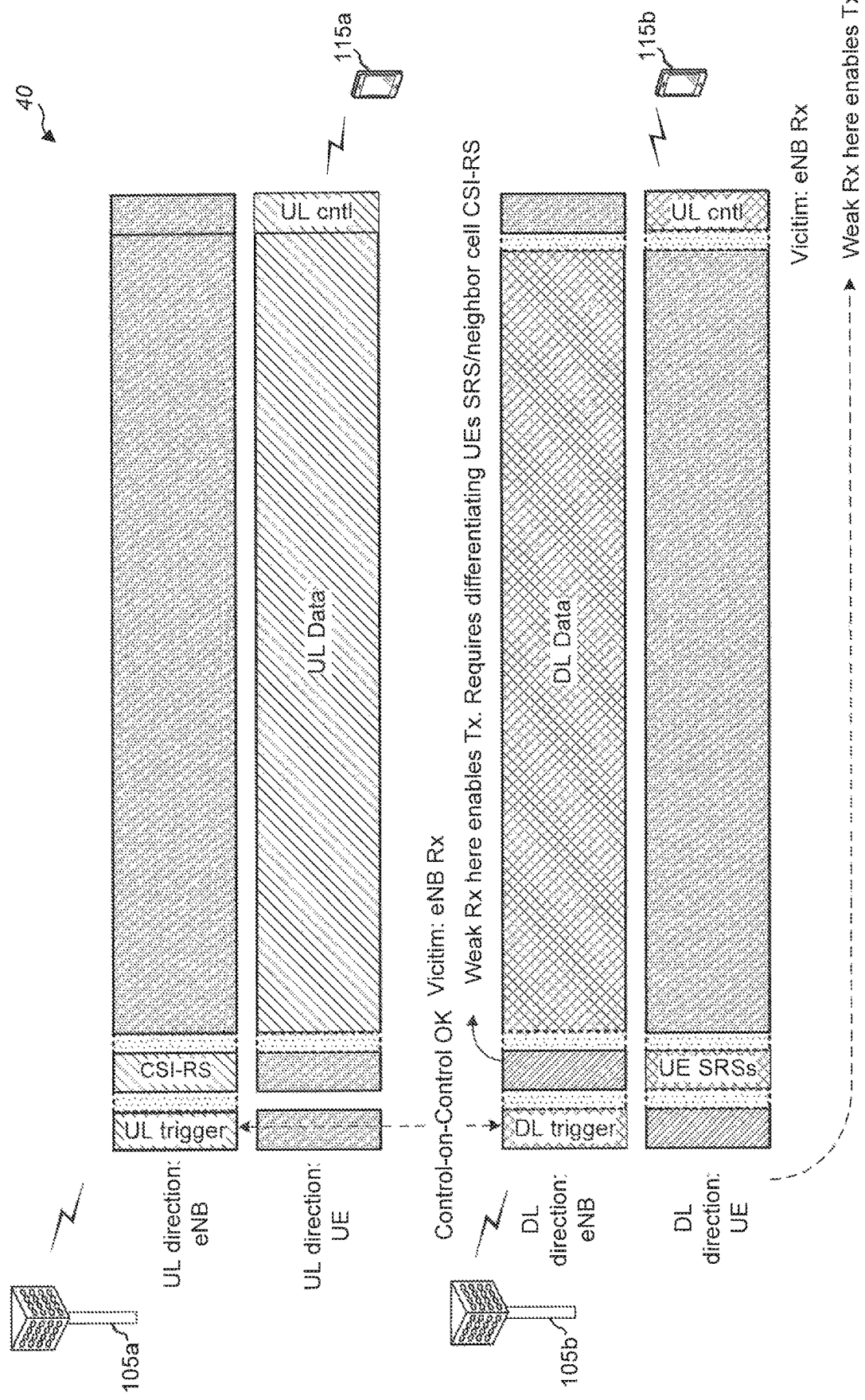
FIG. 4 is a block diagram illustrating base stations and UEs within a single operator and power class competing for access to shared spectrum via dynamic time divisional duplex (TDD).

FIG. 4 is a block diagram illustrating base stations, eNBs 105a and 105b, and UEs 115a and 115b within a single operator and power class competing for access to shared spectrum via dynamic time divisional duplex (TDD). Dynamic TDD for downlink/uplink communications within a single operator and power class provides for designation of a priority or default link direction. Base stations and UEs scheduled for communications in the priority link direction, eNB 105a and UE 115a, would have priority over the base stations and UEs scheduled in the switched direction, eNB 105b and UE 115b. In a control portion of communications between the high-priority entities (e.g., high-priority eNB 105a and high-priority UE 115a) and between the non-priority entities (e.g., eNB 105b and UE 115b), the base stations transmit communication triggers (i.e., downlink triggers for downlink communications and uplink triggers for uplink communications). Simultaneous transmissions of control signaling may be acceptable as in both high-priority and non-priority entity communications, control signals are transmitted using different frequency resources. Accordingly, the different control signals may be differentiated without interference.

For purposes of this disclosure, network entities associated with the higher priority communications will be referred to as the "high-priority" entities (e.g., high-priority receive entity, high-priority transmit entity, high-priority receive/transmit base station/UE), while the network entities associated with the lower-priority communications will be referred to as the "non-priority" entities (e.g., non-priority receive entity, non-priority transmit entity, non-priority receive/transmit base station/UE).

The high-priority or non-priority receiving entity (e.g., base stations for uplink and UEs for downlink) transmits reservation reference signals (RRS), e.g., CSI-RS, SRS, etc. The potential non-priority transmitting entity listens for these RRS from the high-priority receiving entity. For example, with a priority uplink direction, eNB 105b and UE 115b, scheduled for downlink, are the non-priority entities, which listen for the high priority base station, eNB 105a, transmission of CSI-RS. In this example, if the potential non-priority eNB, eNB 105b, does not detect an RRS (e.g., the CSI-RS) from eNB 105a, eNB 105b would then begin downlink transmissions. Interference or transmission collisions may occur when the non-priority transmitting entities fail to detect RRS transmissions from the higher priority receiving entities leading to transmissions on the shared spectrum by both the high-priority entities and the non-priority entities.

A coloring concept has further been suggested which applies the contention operations of dynamic TDD, but with prioritized medium access across different operators, different power classes, and link directions, and, in additional options, using frequency divisional multiplex (FDM) contention. The various suggested operations aim to achieve TDM operation with different colors, including different operators, different power class, and different link direction. In addition, spatial processing has been exploited across multiple operators to null out the interference to other operators. Such applications and techniques have been mainly focused on downlink-to-downlink interference, where one cluster of base stations attempts to minimize the downlink interference to UEs scheduled by another cluster of base stations.

Various aspects of the present disclosure provide for exploiting spatial processing to specifically schedule interference/transmissions to allow for transmissions of both high-priority and non-priority entities, instead of requiring the non-priority entities to always yield transmissions based on the measured signal/interference from other high priority entities. The specific scheduling may suppress the other color interference, either by nulling interference, or placing it in a subspace that will not interfere with the high priority reception subspace. Such combination of coloring, dynamic TDD, and spatial processing may be used to suppress same link and cross-link interference, as well as TDM/FDM among different colors.

In operation of the various aspects, high-priority receiving entities send RRS on resources that are orthogonal to the RRS of the non-priority entities. Additionally, the RRS in the uplink direction is orthogonal to the RRS in the downlink direction. Thus, the CSI-RS of high-priority base stations are on orthogonal resources to the CSI-RS of the non-priority base stations and the SRS of high-priority and non-priority UEs; and the SRS of the high-priority UEs are on orthogonal resources to the non-priority UEs and the priority and non-priority base stations. The potential non-priority transmit entities measure the RRS from the high-priority receive entities (e.g., CSI-RS from high-priority receive base stations for uplink default, or SRS from high-priority receive UEs for downlink default) to obtain cross-channel estimates. The potential non-priority transmit entities also measure the RRS from non-priority receive entities (e.g., CSI-RS from non-priority base stations for downlink default, or SRS from non-priority UEs for uplink default) to obtain direct channel estimates. For example, as illustrated in FIG. 4, CSI-RS from eNB 105a, the high-priority receive base station in an uplink default network, are used to obtain cross-link downlink channel estimates to eNB 105b, the non-priority base station, while SRS from UE 115b, the non-priority receive UE in a uplink default network, is used to obtain direct downlink channel estimates between eNB 105b and UE 115b. eNB 105b, the non-priority transmit base station, would then schedule downlink data transmission by minimizing interference to the high-priority eNB 105a.

Figure 5:
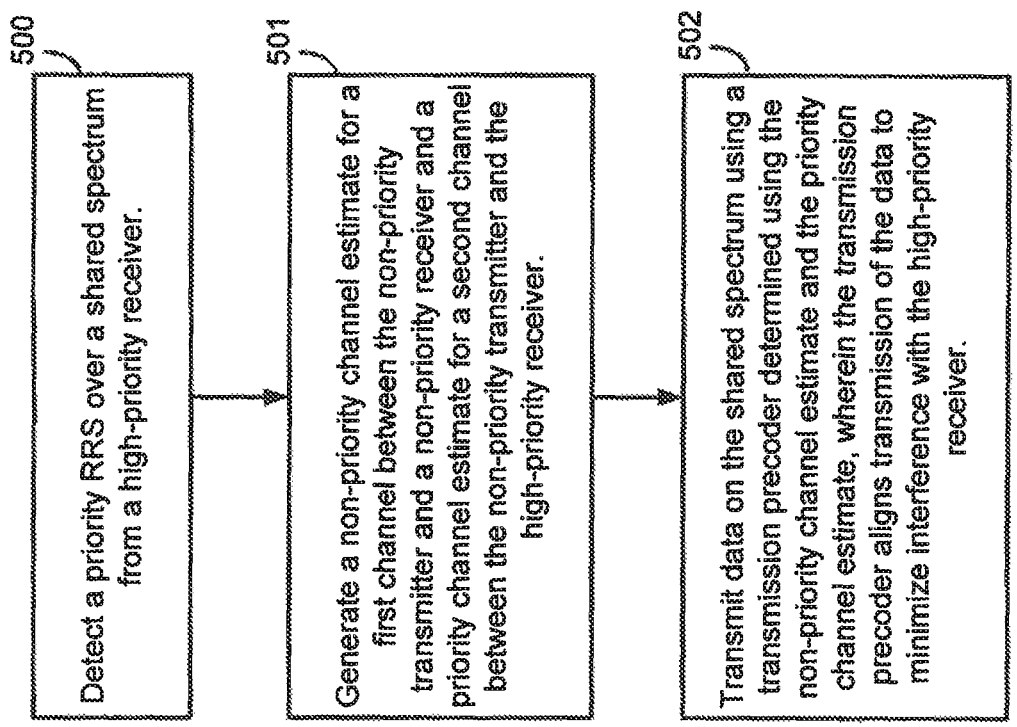
FIG. 5 is a block diagram illustrating example blocks executed to implement one aspect of the present disclosure.
Figure 11:
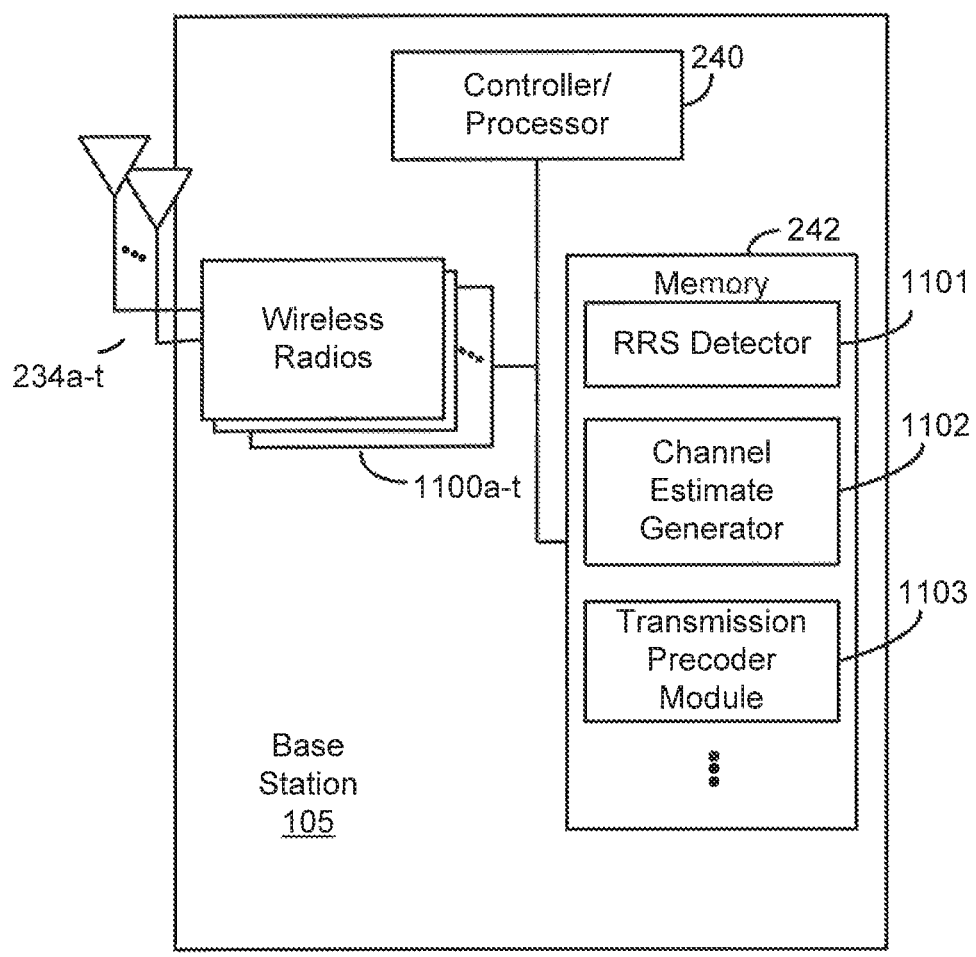
FIG. 11 is a block diagram illustrating an example base station configured according to one aspect of the present disclosure.
Figure 12:
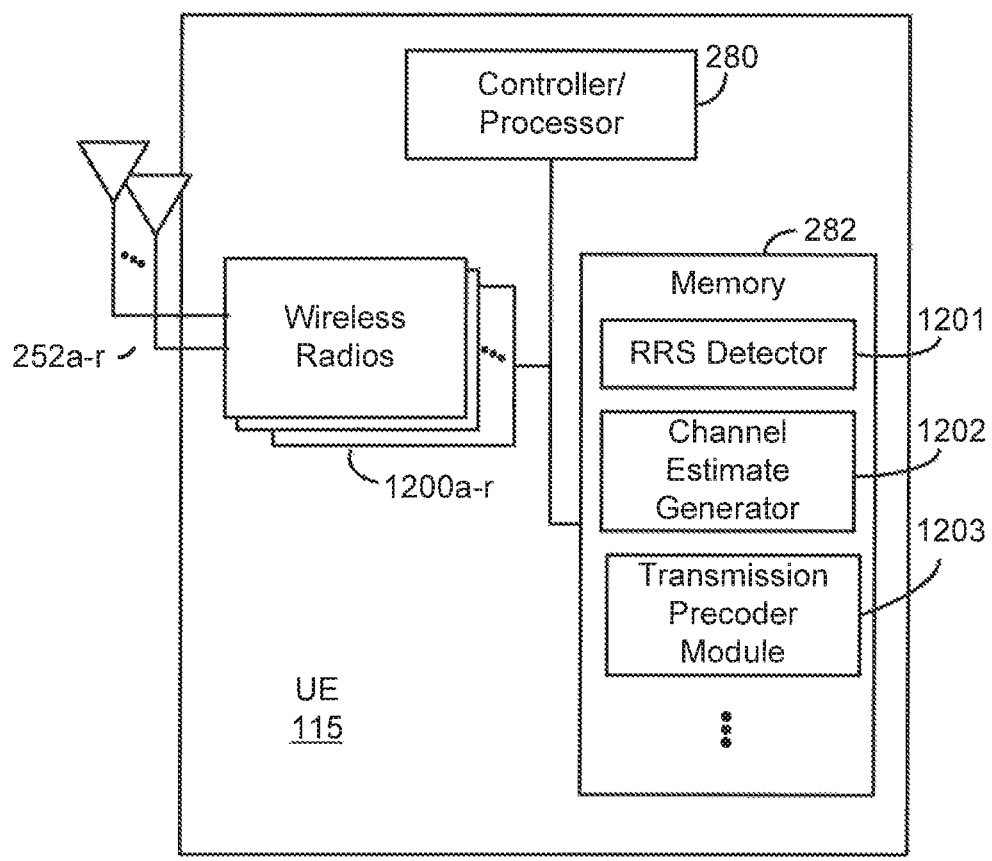
FIG. 12 is a block diagram illustrating an example UE configured according to one aspect of the present disclosure.

FIG. 5 is a block diagram illustrating example blocks executed to implement one aspect of the present disclosure. The example blocks will also be described with respect to base station 105 and UE 115, as illustrated in FIGS. 11 and 12, respectively. FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1100a-t and antennas 234a-t. Wireless radios 1100a-t includes various components and hardware, as illustrated in FIG. 2 for base station 105, including modulator/demodulators 232a-t, MIMO detector 236, receive processor 238, transmit processor 220, and TX MIMO processor 230.

FIG. 12 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1200a-r and antennas 252a-r. Wireless radios 1200a-r includes various components and hardware, as illustrated in FIG. 2 for base station 105, including modulator/demodulators 254a-r, MIMO detector 256, receive processor 258, transmit processor 264, and TX MIMO processor 266.

At block 500, a non-priority transmitter detects a priority RRS over a shared spectrum from a high-priority receiver. For example, UE 115, under control of controller/processor 280, activates RRS detector 1201, stored in memory 282. The execution environment of RRS detector 1201 allows UE 115 to detect the priority RRS over a shared spectrum from a high-priority receiver. Alternatively, base station 105, under control of controller/processor 240, activates RRS detector 1101, stored in memory 242. The execution environment of RRS detector 1101 allows base station 105 to detect the priority RRS over a shared spectrum from a high-priority receiver. The non-priority transmitter has identified a transmission opportunity on a transmission trigger transmitted from the base station of the non-priority communication pair. The transmission trigger may be an uplink or downlink trigger. The priority RRS detected may be a CSI-RS from the high-priority receive base station or an SRS from the high-priority receive UE. The RRS from a non-priority receiver when the default direction is uplink is also SRS, since uplink is default and downlink is the non-priority direction. Thus, the RRS for the downlink receiver entity, which is the non-priority direction, is SRS from a UE. The non-priority transmitter shares access to the shared spectrum with a number of other communication pairs, some of which may have priority over the non-priority transmitter, such as the high-priority receiver. Priority may be determined through coloring, where each color assigned to the communication pair is based on one or more of network operator, power class, link direction, or combination thereof.

At block 501, the non-priority transmitter generates a non-priority channel estimate for a first channel between the non-priority transmitter and its intended non-priority receiver, and a priority channel estimate for a second channel between the non-priority transmitter and the high-priority receiver. For example, UE 115, under control of controller/processor 280, activates channel estimate generator 1202, stored in memory 282. The execution environment of channel estimate generator 1202 allows UE 115 to generate the non-priority channel estimate for the first channel and the priority channel estimate for the second channel. Alternatively, base station 105, under control of controller/processor 240, activates channel estimate generator 1102, stored in memory 242. The execution environment of channel estimate generator 1102 allows base station 105 to generate the non-priority channel estimate for the first channel and the priority channel estimate for the second channel. The various aspects of the present disclosure allow for the non-priority transmitters to perform opportunistic transmission concurrently with priority communications. Thus, when reservation signals of an RRS from the high-priority receiver are detected, the non-priority transmitter begins preparation for transmission by generating channel estimates both in-channel, directly between the non-priority transmitter and the intended non-priority receiver, and cross-channel, between the non-priority transmitter and the high-priority receiver.

At block 502, the non-priority transmitter transmits data on the shared spectrum using a transmission precoder determined based on the non-priority channel estimate and the priority channel estimate, wherein the transmission precoder aligns transmissions of the data to minimize interference with the high-priority receiver. The precoder, based on the in-channel and cross-channel estimates, aligns the transmission in such a way to minimize interference with the high-priority receiver. The alignment may group all interference or form it together in such a way to null the interference as detected by the high-priority receiver. For example, UE 115, under control of controller/processor 280, may activate transmission precoder module 1203, stored in memory 282. The execution environment of transmission precoder module 1203 allows UE 115 to determine a transmission precoder, based on the non-priority channel estimate and the priority channel estimate, and to transmit the data on the shared spectrum, using the transmission precoder, via wireless radios 1200a-r and antennas 252a-r. Alternatively, base station 105, under control of controller/processor 240, may activate transmission precoder module 1203, stored in memory 242. The execution environment of transmission precoder module 1203 allows base station 105 to determine a transmission precoder, based on the non-priority channel estimate and the priority channel estimate, and to transmit the data on the shared spectrum, using the transmission precoder, via wireless radios 1100a-t and antennas 234a-t.

Figure 6:
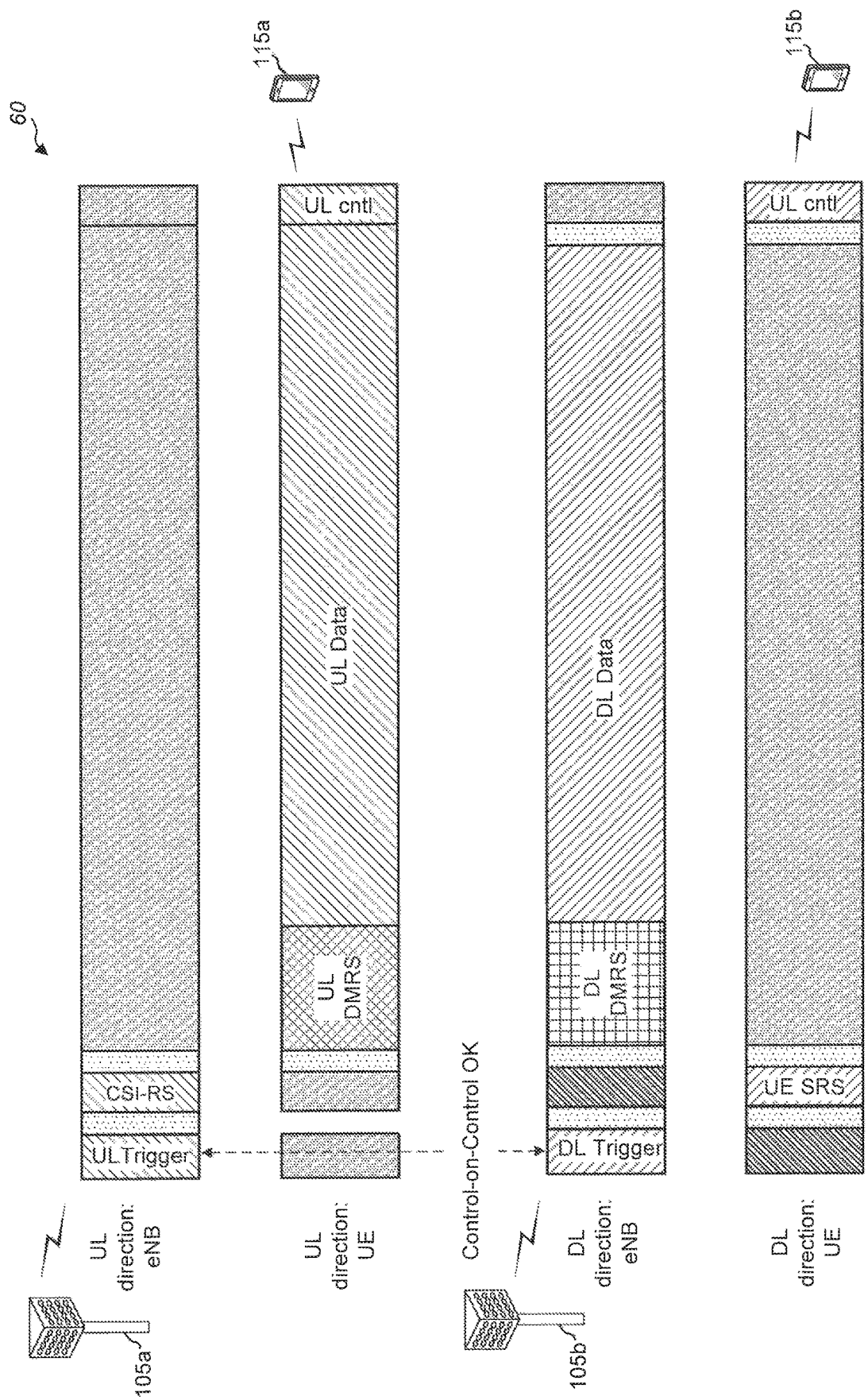
FIG. 6 is a block diagram illustrating a network having base stations and UEs configured according to one aspect of the present disclosure.

FIG. 6 is a block diagram illustrating network 60 having base stations and UEs configured according to one aspect of the present disclosure. While the aspects of the present disclosure provide for overlapping control signals within control portions 602-605 between network entities of different colors, such as colors 600 and 601, the overlapping transmissions do not generate interference as they are transmitted using orthogonal resources even though they are transmitted in the same OFDM symbol. However, because the aspects of the present disclosure allow for the non-priority entities to transmit at the same time that the high-priority entities are transmitting, the overlapping data transmissions, uplink data 606 and downlink data 607, are not similarly transmitted using only orthogonal resources. Therefore, in order to maintain the distinction between the high-priority and non-priority transmitters, various aspects of the present disclosure provide for transmission of DMRS, such as uplink DMRS 608 and downlink DMRS 609, using code divisional multiplexed(CDM)/FDM/TDM with orthogonal or pseudo-orthogonal spaces. If the true orthogonal spaces are used up within the transmissions, then pseudo orthogonal space, such as by applying a different scrambling sequence or applying a different cyclic shift on the same DMRS sequence may be used to preserve orthogonality. By maintaining transmission of uplink DMRS 608 and downlink DMRS 609 as orthogonal or pseudo-orthogonal, the receiving entities in both colors 600 and 601 may decode the DMRS in order to successfully receive and decode uplink data 606 and downlink data 607, respectively.

In a first optional aspect, local spatial divisional multiplexing allows for cross-link transmitter/receiver beamforming to be used for interference avoidance. The matrix of channels, $H_{ij}$, to the receive network entity i (e.g., UE-i or base station-i) from transmitter entities j (e.g., base station -j or UE-j). The matrix of transmit beams for the receive network entity i, $W_{ij}$, is the transmission precoder that may be used with the data transmission equation:

$$\begin{bmatrix} y_1 \\ y_2 \end{bmatrix} = \begin{bmatrix} H_{11} \\ H_{21} \end{bmatrix} W_{11} s_1 + \begin{bmatrix} n_1 \\ n_2 \end{bmatrix} \quad (1)$$

In order to align the interference of the switched or non-priority entities, transmit beamforming may be used to avoid interference to the high-priority receive entities. For example, where the cross channel estimate between color 601 transmitter (eNB 105*b*) and color 600 receiver (eNB 115*a*), $H_{21}$, is multiplied by the transmission precoder of the non-priority entities (eNB 105*b* and UE 115*b*), $W_{11}$, the resulting product should approach 0 if the channel estimate, 112, and transmission precoder, $W_{11}$, accurately represent the cross-channel subspace available for aligning the interfering transmissions.

$$H_{21} W_{11} \approx 0 \quad (2)$$

The non-priority transmitter entity (eNB 105*b*) can select the scheduled receivers to minimize the interference to the high-priority receiver (eNB 105*a*). If the non-priority transmitters are not able to align or null out the interference, they will refrain from transmission. For example, when a non-priority transmitter (e.g., base station or UE) does not have multiple transmit antennas, the appropriate subspace in the cross-channel space may not be available. However, for a transmitter base station, joint processing across multiple transmit base station may be used to achieve the same purpose. Thus, a non-priority transmitter base station that does not have sufficient multiple antennas for determining the appropriate cross-channel subspace to align interference may use joint processing of other transmit base stations to find that appropriate cross channel subspace, resulting in fewer instances where the non-priority transmit base station refrains from transmitting concurrently with the high-priority transmit entity.

In a second optional aspect, local spatial divisional multiplexing allows for cross-link transmitter/receiver beamforming to be used for interference alignment. High-priority receivers, such as eNB 105*a*, cooperate with lower priority transmitters, such as eNB 105*b*, and broadcast a receive subspace identifier useful for aligning interference. The receive subspace identifier may either identify the subspace within which interference may be aligned or may identify the subspace within which the high-priority receiver (eNB 105*a*) intends to receive communications. The non-priority transmitter (eNB 105*b*) may then use this information to schedule its transmissions, thereby, aligning the non-priority transmission to avoid interference with receiving the priority transmission. The receive subspace identifier may be included with the RRS transmitted by the high-priority receiver (eNB 105*a*), or alternatively, eNB 105*a* may broadcast the receive subspace identifier separately.

The channel estimate, $H=U\Delta V^H$, reflects the channel between the high priority transmitter and high priority receiver, in which the receiver has at least N antennas, where U and V represent unitary sub-matrices, Δ represents a diagonal matrix whose elements are the singular values of the original matrix in descending order, and $V^H$ represents the conjugate transpose of the matrix V. The receive subspace identifier can be represented by $U_m$, as the subspace for aligning interference. For example let $U_m$=U[:, N−m+1: N] represent subspace allocated for interference. The span{$U_m$} is the span of the m left singular vectors of H corresponding to the m smallest singular values of the channel estimate, H. The matrix G represents the cross-channel estimate between the lower-priority transmitter (eNB 105*b*) and higher-priority receiver (eNB 105*a*), where $W_G$ represents the transmit precoder for the cross-channel estimate. Low priority transmitters, such as eNB 105*b*, will attempt to transmit their signals within the interference aligned subspace, $U_m$, such that:

$$\text{span}\{GW_G\} \cup \text{span}\{U_m\} \quad (3)$$

It should be noted that the first optional aspect, in which the spatial processing is used to null the interference outside of the location where the higher priority transmission are scheduled is a subset or special case of the presently described option which operates to schedule specific locations for aligning the interference—either by specifying the location of the intended higher priority transmission or the location of the subspace where transmission of non-priority signals will not interfere with the high-priority transmission.

Figure 7B:
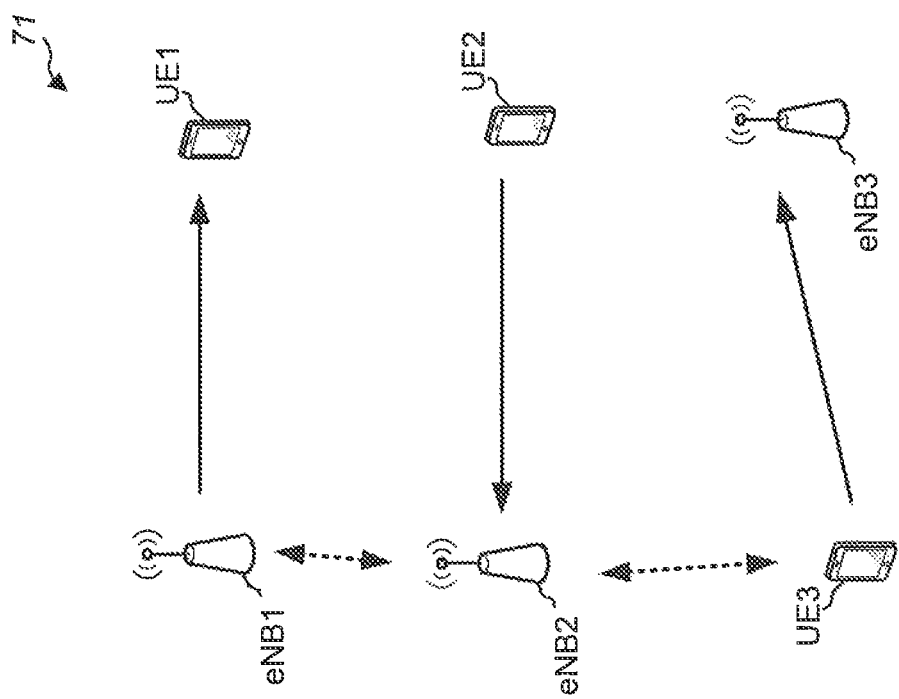
FIG. 7B is a block diagram illustrating a network having eNBs and UEs operating shared access configured according to one aspect of the present disclosure.
Figure 7A:
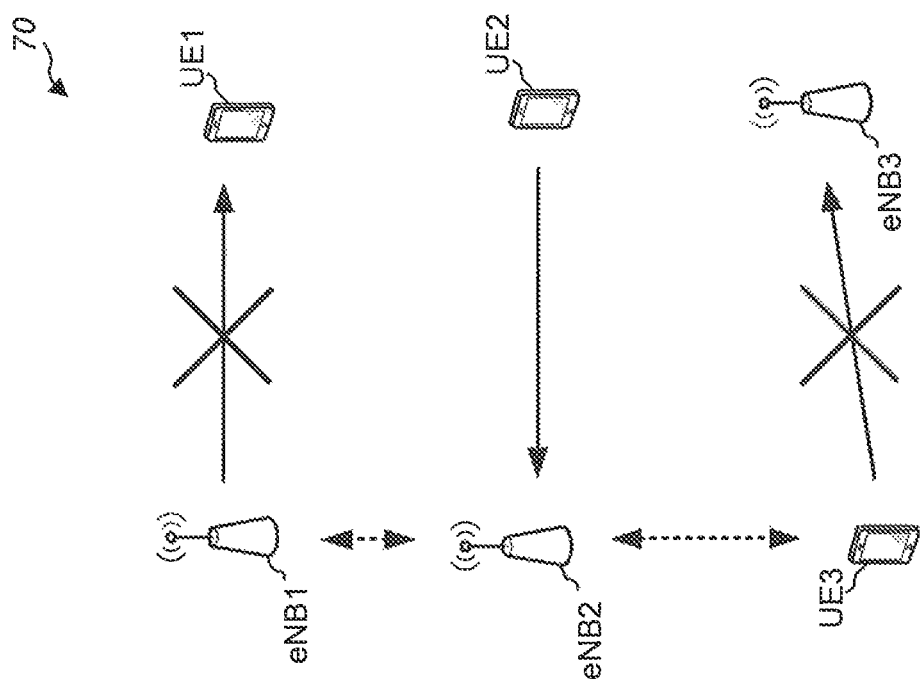
FIG. 7A is a block diagram illustrating a network having eNBs and UEs operating shared access using dynamic TDD without combined spatial processing.

FIG. 7A is a block diagram illustrating a network 70 having eNBs 1-3 and UEs 1-3 operating shared access using dynamic TDD without combined spatial processing. eNB1 and eNB2 belong to the higher priority operator. The default direction for eNB1 and eNB2 is uplink. eNB3 belongs to the lower priority operator with a default uplink direction. eNB1 detects RRS from eNB2 and, as a result, refrains from transmitting its scheduled downlink to UE1. Similarly, UE3 also detects RRS from eNB2 and refrains from transmitting uplink to eNB3. Accordingly, by using only dynamic TDD, eNB1 refrains from transmission to UE 3.

FIG. 7B is a block diagram illustrating a network 70 having eNBs 1-3 and UEs 1-3 operating shared access configured according to one aspect of the present disclosure. With spatial interference management, and considering the same assumptions from above, eNB2 transmits RSS and includes a receive subspace indicator used for interference alignment. eNB1, in consideration of the receive subspace indicator, determines a transmit precoder to lie within that subspace where downlink communications to UE1 may be transmitted without causing interference to the priority uplink communications from UE2 to eNB2. UE3 also applies a transmit precoder that lies within the interference-aligned subspace indicated by the receive subspace indicator from eNB2, such that uplink transmissions from UE3 may be transmitted with little interference caused to the priority uplink transmissions at eNB2. Each of the non-priority transmissions, from eNB1 and UE3 may be transmitted with a limited number of layers, for example up to m layers, where m, as previously defined, represents the number of left singular vectors of the whole subspace U corresponding to the m smallest singular values of the channel estimate, H.

It should be noted that the determination of the transmit precoder to fall within the interference alignment subspace depends on the number of antennas the non-priority transmitter has. Therefore, for example, if UE3 did not have a sufficient number of transmit antennas that would allow for such a transmit precoder, then UE3 may yield and refrain from its uplink transmission while eNB2 is transmitting data.

Figure 8:
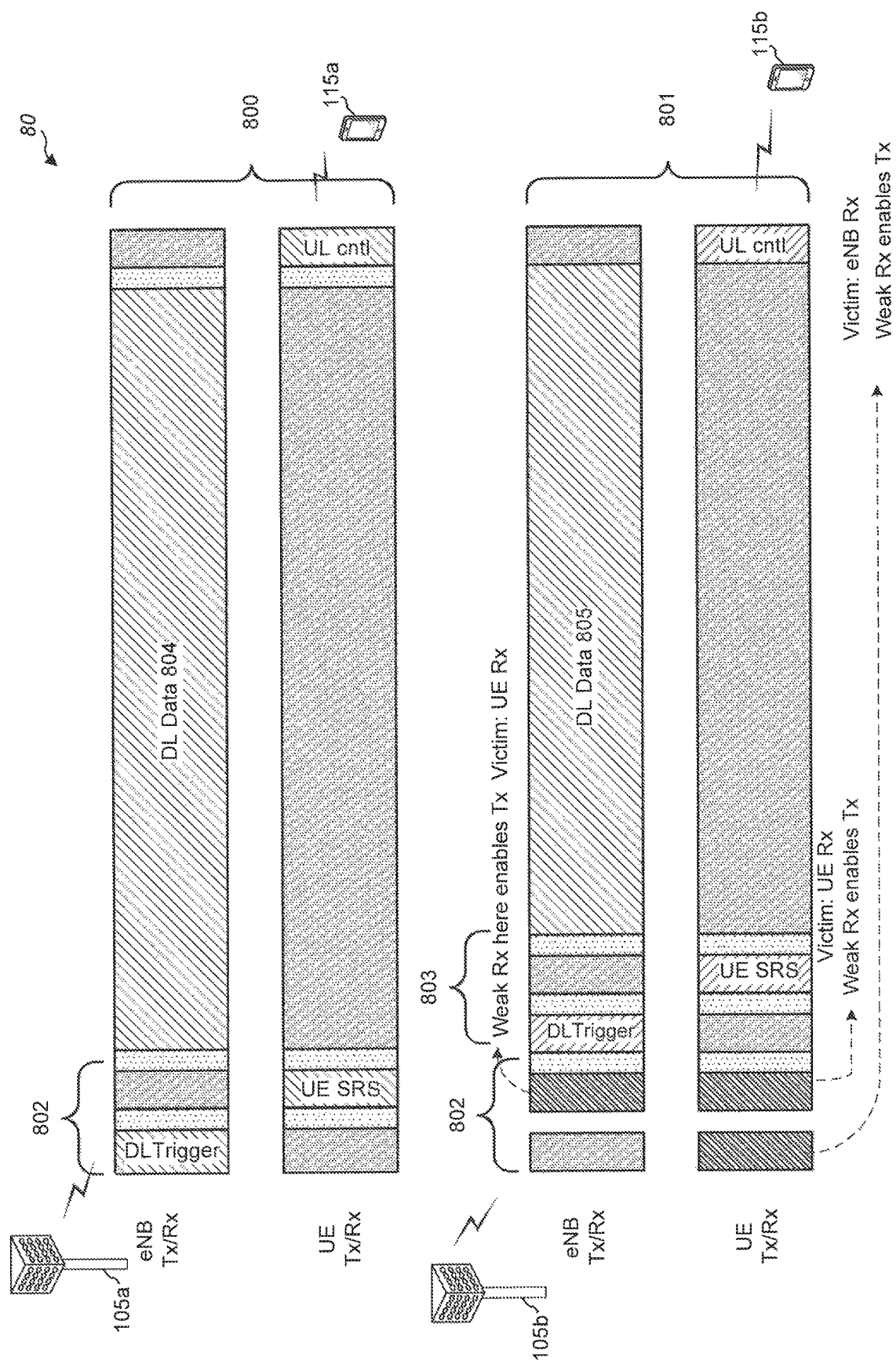
FIG. 8 is a block diagram illustrating a network operating a coloring scheme for shared spectrum access.

FIG. 8 is a block diagram illustrating a network 80 operating a coloring scheme for shared spectrum access. eNB 105a and UE 115a belong to color 800, while eNB 105b and UE 115b belong to color 801. The colors of color 800 and 801 may be representative of different network operators, different power classes, different link directions, or some combination thereof. As illustrated, colors 800 and 801 both have default downlink directions. The example illustrated in FIG. 8 identifies two different colors, but two or more different colors may be used in systems configured using a coloring scheme. As the high-priority entities, the control region of the transmission frame includes a protected control location 802, in which the network entities of color 800 contend for access to the shared spectrum. Within protected control location 802, eNB 105a may transmit a downlink trigger when there is downlink data for transmission to UE 115a. Also, within protected control location 802, UE 115a may respond to downlink trigger by transmitting its RRS (e.g., an SRS). When downlink data is available, the SRS transmission from UE 115a informs the surrounding network entities that UE 115a intends to receive downlink data on the shared spectrum.

Also within protected control location 802, non-priority eNB 105b and UE 115b of color 801 listen for the reservation signals from any higher-priority transmitters. With the default downlink direction, if neither eNB 105b nor UE 115b detect reservation signals from a higher-priority network entity, then eNB 105b and UE 115b would perform spectrum contention in protected control location 803. Similarly to color 800 entities, eNB 105b would transmit a downlink trigger which would be followed by the RRS from UE 115b of SRS. The RRS from the network entities of color 801 also notify surrounding lower-priority entities that UE 115b intends to receive downlink information. If the high-priority network entities of color 800 have not reserved the shared spectrum, then the reservation of the spectrum in protected control location 803 by eNB 105b and UE 115b would allow eNB 105b to transmit downlink data 805 to UE 105b. Otherwise, if eNB 105a and UE 115a had reserved the shared spectrum in protected control location 802, eNB 105a would transmit downlink data 804 to UE 115a.

Figure 9:
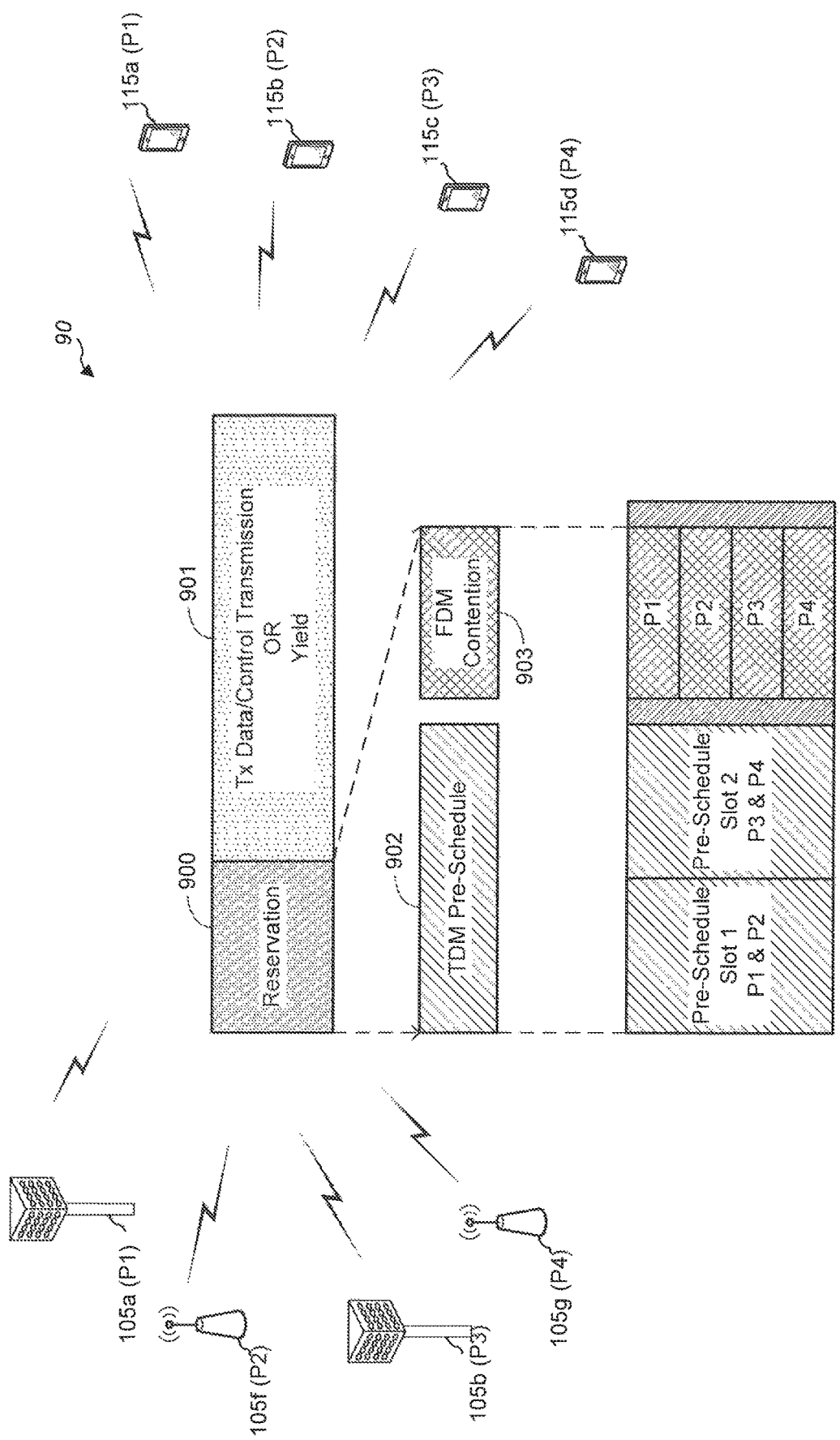
FIG. 9 is a block diagram illustrating a network configured for prioritized opportunistic medium access.

FIG. 9 is a block diagram illustrating a network 90 configured for prioritized opportunistic medium access. Communications between network entities of two network operators occur via shared spectrum of network 90. Communication pairs P1 and P2 belong to a first higher priority network operator, while pairs P3 and P4 belong to a second lower priority network. Communication pair P1, between eNB 105a and UE 115a has a downlink default direction; communication pair P2, between eNB 105f and UE 115b has an uplink default direction; communication pair P3, between eNB 105b and UE 115c has a downlink default direction and communication pair P4, between eNB 105g and UE 115d has an uplink default direction. The communication frame includes reservation segment 900 and data section 901. If the high-priority transmitter secures the spectrum, the data transmitted would be transmitted during data section 901.

Reservation segment 900 includes a TDM pre-schedule segment 902 and an FDM contention segment 903. Pre-assigned frequency resources are defined for RRS for each priority. The pre-scheduling of communication pairs from the same operator, such as P1 and P2 or P3 and P4, may be performed in the same slot. Thus, only half of the pre-schedule slots of TDM pre-scheduled segment 902 may be used. As illustrated, pre-schedule slot 1 is used for pre-scheduling communication pairs P1 and P2, while pre-schedule slot 2 is used for pre-scheduling communication pairs P3 and P4.

When the communication pairs support both regular and ultra-reliable, low latency communications (URLLC), the RRS may include a URLLC indication. The URLLC communications have a higher priority than any other regular communication, regardless of the priority assigned to the different network operators. For example, URLLC for pair P1 has the highest priority, followed by URLLC for pair P2, URLLC for pair P3, URLLC for pair P4, regular communication for pair P1, regular communication for pair P2, regular communication for pair P3, and regular communication for pair P4. Thus, after pre-scheduling the communication pair with RRQs in TDM pre-schedule segment 902, the multiple communication pairs, P1-P4, perform contention resolution in assigned frequencies within FDM contention segment 903.

The various aspects of the present disclosure provide for combining the concepts of coloring, dynamic TDD, and spatial processing. In general, the non-priority transmitters measure the channel estimate to the non-priority receiver and high-priority receiver. The non-priority transmitter attempts to beamform a transmission beam, such that the non-priority transmitter interference to the high-priority receiver is minimized. This concept is typically applicable when there is a limited number of dominant active UE receivers, or non-priority transmit UEs have multiple transmit antennas. In sub-6 GHz band, UEs are typically equipped with only a small number of transmit antennas. Thus, the sub-6 GHz band UEs may yield and refrain from uplink opportunistic transmission.

Figure 10:
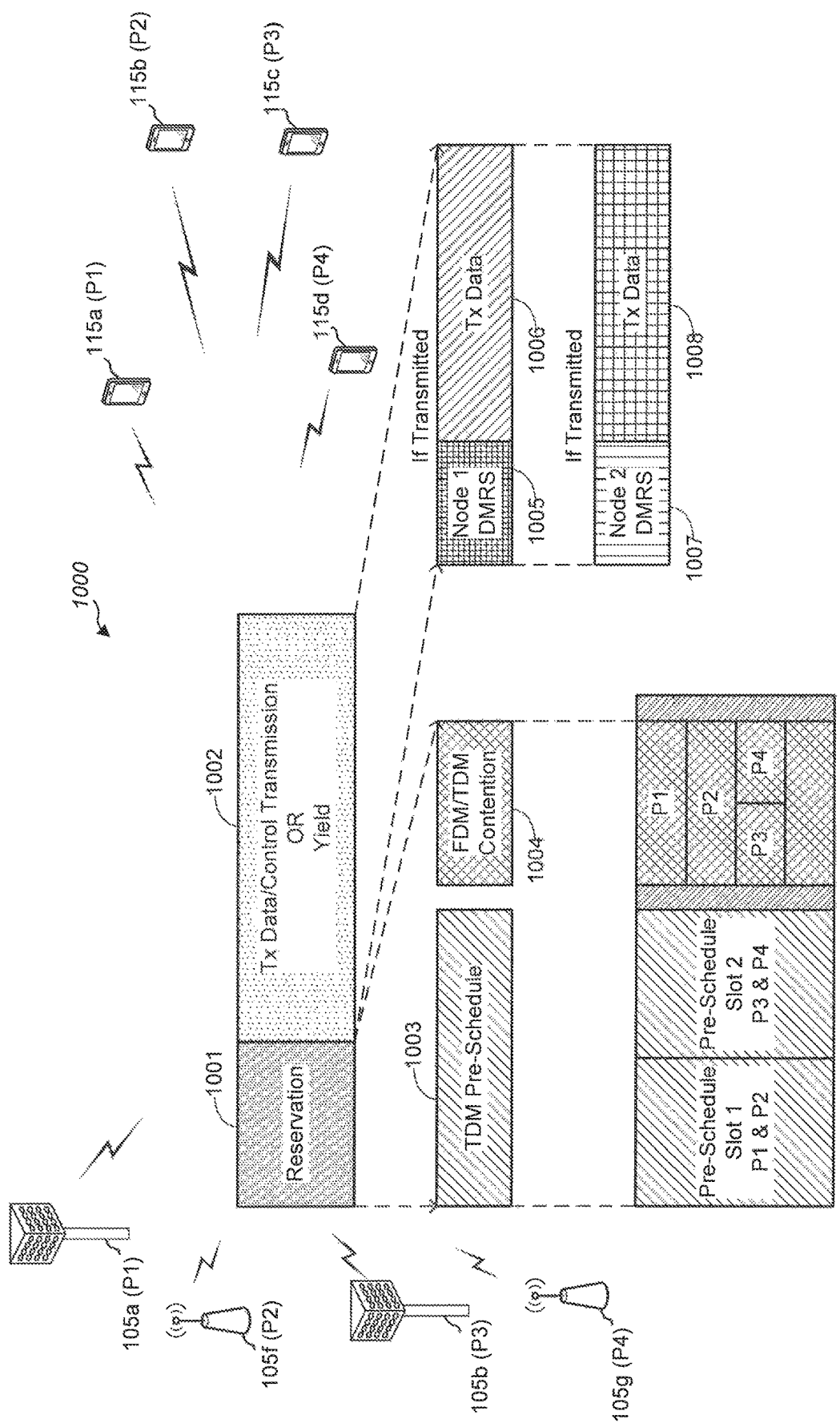
FIG. 10 is a block diagram illustrating a network configured according to one aspect of the present disclosure.

FIG. 10 is a block diagram illustrating a network 1000 configured according to one aspect of the present disclosure. In the illustrated aspect of network 1000, a combination of coloring, dynamic TDD, and spatial processing, may be applied for efficiently sharing spectrum between communicating entities based on network operator, power class, link direction, or combination thereof. Within the transmission frame, there is a reservation segment 1001 and data section 1002. As with the procedure described with respect to FIG. 9, reservation segment 1001 includes TDM pre-schedule segment 1003 and contention segment 1004. Pre-assigned frequency resources are defined for RRS for each priority. The pre-scheduling of communication pairs from the same operator, such as P1 and P2 or P3 and P4, may also be performed in the same slot. As illustrated, pre-schedule slot 1 is used for pre-scheduling communication pairs P1 and P2, while pre-schedule slot 2 is used for pre-scheduling communication pairs P3 and P4.

Contention signals within contention segment 1004 may include CSI-RS from base stations, such as base stations 105a, 105b, 105f, and 105g, and SRS from UEs, such as UEs 115a-d. The communication pairs P1-P4 may perform spectrum contention using either FDM, such as for P1 and P2, or TDM, such as for P3 and P4. Lower priority transmitter nodes can opportunistically transmit data in data section 1002 subject to the interference level injected to higher priority receiver nodes. Spatial processing may be among different colors, including different operators, different link directions, different power classes, or any combination thereof. For example, a lower priority transmitter eNB, such as eNBs 105b and 105g, can try to align or null out interference to other receiving UEs or receiving eNBs within and/or across different operators. However, if the lower priority transmitter cannot successfully determine a transmission precoder that allows for transmission alignment or nulling of its interference with respect to the high-priority receiving entity, the lower priority transmitter may yield transmission accordingly.

When transmission of data is not yielded, an additional aspect of the present disclosure provides for the data section 1002 to begin with transmission of DMRS using CDM/FDM/TDM to maintain orthogonality among different colors, operators, power classes, links, and the like. Thus, when data is to be transmitted in data section 1002, node 1, which, for example, may be UE 115d transmitting URLLC uplink data 1006, transmits DMRS 1005, as the high-priority transmitter, while node 2, which, for example, may be eNB 105a transmitting downlink data 1008, transmits DMRS 1007. DMRS 1005 is orthogonal to DMRS 1007 in order to allow the receiving entity to correctly decode the right DMRS and consequently decode either of uplink data 1006 or downlink data 1008 correctly. To allow for better orthogonality, the DMRS sequence of DMRS 1005 and 1007 can be the same among different colors and different links but shifted by different cyclic shifts. Using the same DMRS sequence shifted according to different color or link may work when the DMRS is not public land mobile number (PLMN) specific or link specific or cell specific. Moreover, when the orthogonal spaces for DMRS have all been assigned, different scrambling may be used to achieve pseudo orthogonality to minimize the DMRS overhead. A guard period would be inserted to allow for processing time for the nodes and timing alignment between different nodes/links.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    detecting, by a non-priority transmitter entity, a priority reservation reference signal (RRS) over a shared spectrum from a high-priority receiver entity, wherein the shared spectrum is shared by the non-priority transmitter entity with at least one high-priority communication pair, wherein the at least one high-priority communication pair includes a high-priority transmitter entity and the high-priority receiver entity;
    generating, by the non-priority transmitter entity, a non-priority channel estimate for a first channel between the non-priority transmitter entity and a non-priority receiver entity and a priority channel estimate for a second channel between the non-priority transmitter entity and the high-priority receiver entity;
    transmitting, by the non-priority transmitter entity, a demodulation reference signal, wherein the demodulation reference signal is one of: orthogonal or pseudo-orthogonal, to a priority demodulation reference signal concurrently transmitted by the high-priority transmitter entity on the shared spectrum; and
    transmitting, by the non-priority transmitter entity, data on the shared spectrum using a transmission precoder determined using the non-priority channel estimate and the priority channel estimate, wherein the transmission precoder aligns transmission of the data to minimize interference with the high-priority receiver entity.

2. The method of claim 1, further including:
    yielding, by the non-priority transmitter entity, the transmitting of the data based on a failure to determine the transmission precoder.

3. The method of claim 1, wherein the alignment of the data by the transmission precoder nullifies the interference of the data transmission at the high-priority receiver entity.

4. The method of claim 1, further including:
    receiving, by the non-priority transmitter entity, a receive subspace indicator from the high-priority transmitter entity, wherein the receive subspace indicator identifies a transmission subspace for the transmitting the data.

5. The method of claim 4, wherein the transmission subspace includes one of:
    an interference subspace for aligning interference; or
    a receive subspace in which the high-priority receiver entity intends to receive priority communications.

6. The method of claim 1, wherein the demodulation reference signal is pseudo-orthogonal, and further including one of:
    scrambling a demodulation reference sequence by a scrambling code associated with a priority level of the non-priority transmitter entity; or
    shifting the demodulation reference sequence by a cyclic shift associated with the priority level.

7. The method of claim 1, wherein priority of the at least one high-priority communication pair and the non-priority transmitter entity is determined according to one of:
    a network operator associated with the at least one high-priority communication pair and the non-priority transmitter entity;
    a power class of a base station or user equipment (UE) of the at least one high-priority communication pair and the non-priority transmitter entity;
    a link direction; or
    any combination thereof.

8. The method of claim 1, wherein the demodulation reference signal is orthogonal to the priority demodulation reference signal.

9. The method of claim 1, wherein the demodulation reference signal is pseudo-orthogonal to the priority demodulation reference signal.

10. The method of claim 1, further including scrambling a demodulation reference sequence by a scrambling code associated with a priority level of the non-priority transmitter entity, wherein the demodulation reference signal is pseudo-orthogonal.

11. The method of claim 1, shifting a demodulation reference sequence by a cyclic shift associated with a priority level of the non-priority transmitter entity, wherein the demodulation reference signal is pseudo-orthogonal.

12. An apparatus configured for wireless communication, comprising:
    means for detecting, by a non-priority transmitter entity, a priority reservation reference signal (RRS) over a shared spectrum from a high-priority receiver entity, wherein the shared spectrum is shared by the non-priority transmitter entity with at least one high-priority communication pair, wherein the at least one high-priority communication pair includes a high-priority transmitter entity and the high-priority receiver entity;
    means for generating, by the non-priority transmitter entity, a non-priority channel estimate for a first channel between the non-priority transmitter entity and a non-priority receiver entity and a priority channel estimate for a second channel between the non-priority transmitter entity and the high-priority receiver entity;
    means for transmitting, by the non-priority transmitter entity, a demodulation reference signal, wherein the demodulation reference signal is one of: orthogonal or pseudo-orthogonal, to a priority demodulation reference signal concurrently transmitted by the high-priority transmitter entity on the shared spectrum; and
    means for transmitting, by the non-priority transmitter entity, data on the shared spectrum using a transmission precoder determined using the non-priority channel estimate and the priority channel estimate, wherein the transmission precoder aligns transmission of the data to minimize interference with the high-priority receiver entity.

13. The apparatus of claim 12, further including:
    means for yielding, by the non-priority transmitter entity, transmission of the data based on a failure to determine the transmission precoder.

14. The apparatus of claim 12, wherein the alignment of the data by the transmission precoder nullifies the interference of the data transmission at the high-priority receiver entity.

15. The apparatus of claim 12, further including:
means for receiving, by the non-priority transmitter entity, a receive subspace indicator from the high-priority transmitter entity, wherein the receive subspace indicator identifies a transmission subspace for the means for transmitting the data.

16. The apparatus of claim 15, wherein the transmission subspace includes one of:
an interference subspace for aligning interference; or
a receive subspace in which the high-priority receiver entity intends to receive priority communications.

17. The apparatus of claim 12, wherein the demodulation reference signal is pseudo-orthogonal, the apparatus further including one of:
means for scrambling a demodulation reference sequence by a scrambling code associated with a priority level of the non-priority transmitter entity; or
means for shifting the demodulation reference sequence by a cyclic shift associated with the priority level.

18. The apparatus of claim 12, wherein priority of the at least one high-priority communication pair and the non-priority transmitter entity is determined according to one of:
a network operator associated with the at least one high-priority communication pair and the non-priority transmitter entity;
a power class of a base station or user equipment (UE) of the at least one high-priority communication pair and the non-priority transmitter entity;
a link direction; or
any combination thereof.

19. A non-transitory computer-readable medium having program code recorded thereon, the program code comprising:
program code executable by a computer for causing the computer to detect, by a non-priority transmitter entity, a priority reservation reference signal (RRS) over a shared spectrum from a high-priority receiver entity, wherein the shared spectrum is shared by the non-priority transmitter entity with at least one high-priority communication pair, wherein the at least one high-priority communication pair includes a high-priority transmitter entity and the high-priority receiver entity;
program code executable by the computer for causing the computer to generate, by the non-priority transmitter entity, a non-priority channel estimate for a first channel between the non-priority transmitter entity and a non-priority receiver entity and a priority channel estimate for a second channel between the non-priority transmitter entity and the high-priority receiver entity;
program code executable by the computer for causing the computer to transmit, by the non-priority transmitter entity, a demodulation reference signal, wherein the demodulation reference signal is one of: orthogonal or pseudo-orthogonal, to a priority demodulation reference signal concurrently transmitted by the high-priority transmitter entity on the shared spectrum; and
program code executable by the computer for causing the computer to transmit, by the non-priority transmitter entity, data on the shared spectrum using a transmission precoder determined using the non-priority channel estimate and the priority channel estimate, wherein the transmission precoder aligns transmission of the data to minimize interference with the high-priority receiver entity.

20. The non-transitory computer-readable medium of claim 19, further including:
program code executable by the computer for causing the computer to yield, by the non-priority transmitter entity, transmission of the data based on a failure to determine the transmission precoder.

21. The non-transitory computer-readable medium of claim 19, wherein the alignment of the data by the transmission precoder nullifies the interference of the data transmission at the high-priority receiver entity.

22. The non-transitory computer-readable medium of claim 19, further including:
program code executable by the computer for causing the computer to receive, by the non-priority transmitter entity, a receive subspace indicator from the high-priority transmitter entity, wherein the receive subspace indicator identifies a transmission subspace for the program code executable by the computer for causing the computer to transmit the data.

23. The non-transitory computer-readable medium of claim 19, wherein priority of the at least one high-priority communication pair and the non-priority transmitter entity is determined according to one of:
a network operator associated with the at least one high-priority communication pair and the non-priority transmitter entity;
a power class of a base station or user equipment (UE) of the at least one high-priority communication pair and the non-priority transmitter entity;
a link direction; or
any combination thereof.

24. An apparatus configured for wireless communication, the apparatus comprising:
at least one processor; and
a memory coupled to the at least one processor,
wherein the at least one processor is configured:
to detect, by a non-priority transmitter entity, a priority reservation reference signal (RRS) over a shared spectrum from a high-priority receiver entity, wherein the shared spectrum is shared by the non-priority transmitter entity with at least one high-priority communication pair, wherein the at least one high-priority communication pair includes a high-priority transmitter entity and the high-priority receiver entity;
to generate, by the non-priority transmitter entity, a non-priority channel estimate for a first channel between the non-priority transmitter entity and a non-priority receiver entity and a priority channel estimate for a second channel between the non-priority transmitter entity and the high-priority receiver entity;
to transmit, by the non-priority transmitter entity, a demodulation reference signal, wherein the demodulation reference signal is one of: orthogonal or pseudo-orthogonal, to a priority demodulation reference signal concurrently transmitted by the high-priority transmitter entity on the shared spectrum; and
to transmit, by the non-priority transmitter entity, data on the shared spectrum using a transmission precoder determined using the non-priority channel estimate and the priority channel estimate, wherein the transmission precoder aligns transmission of the data to minimize interference with the high-priority receiver entity.

25. The apparatus of claim 24, further including configuration of the at least one processor to yield, by the non-priority transmitter entity, transmission of the data based on a failure to determine the transmission precoder.

26. The apparatus of claim 24, wherein the alignment of the data by the transmission precoder nullifies the interference of the data transmission at the high-priority receiver entity.

27. The apparatus of claim 24, further including configuration of the at least one processor to receive, by the non-priority transmitter entity, a receive subspace indicator from the high-priority transmitter entity, wherein the receive subspace indicator identifies a transmission subspace for the configuration to transmit the data.

28. The apparatus of claim 27, wherein the transmission subspace includes one of:
   an interference subspace for aligning interference; or
   a receive subspace in which the high-priority receiver entity intends to receive priority communications.

29. The apparatus of claim 24, wherein the demodulation reference signal is pseudo-orthogonal, the apparatus further including configuration of the at least one processor to one of:
   scramble a demodulation reference sequence by a scrambling code associated with a priority level of the non-priority transmitter entity; or
   shift the demodulation reference sequence by a cyclic shift associated with the priority level.

30. The apparatus of claim 24, wherein priority of the at least one high-priority communication pair and the non-priority transmitter entity is determined according to one of:
   a network operator associated with the at least one high-priority communication pair and the non-priority transmitter entity;
   a power class of a base station or user equipment (UE) of the at least one high-priority communication pair and the non-priority transmitter entity;
   a link direction; or
   any combination thereof.

* * * * *